United States Patent
Girard et al.

(10) Patent No.: US 12,517,000 B2
(45) Date of Patent: Jan. 6, 2026

(54) METHOD OF DETERMINING A CONTAINER TIGHTNESS

(71) Applicant: SCHOTT Pharma Schweiz AG, St. Gallen (CH)

(72) Inventors: Marielle Girard, St. Gallen (CH); Rahel Egli, Waldkirch (CH)

(73) Assignee: SCHOTT Pharma Schweiz AG, St. Gallen (CH)

( * ) Notice: Subject to any disclaimer, the term of this patent is extended or adjusted under 35 U.S.C. 154(b) by 306 days.

(21) Appl. No.: 18/323,871

(22) Filed: May 25, 2023

(65) Prior Publication Data

US 2023/0393015 A1    Dec. 7, 2023

(30) Foreign Application Priority Data

Jun. 2, 2022 (EP) .................................... 22177085

(51) Int. Cl.
*G01M 3/22* (2006.01)

(52) U.S. Cl.
CPC .................................... *G01M 3/226* (2013.01)

(58) Field of Classification Search
CPC ............ G01M 3/00; G01M 3/20; G01M 3/22; G01M 3/226
See application file for complete search history.

(56) References Cited

U.S. PATENT DOCUMENTS

| | | | | |
|---|---|---|---|---|
| 7,290,439 | B2 * | 11/2007 | Perkins | G01M 3/202 73/40 |
| 10,697,850 | B2 * | 6/2020 | Schindler | G01M 3/329 |
| 11,280,695 | B2 * | 3/2022 | Brasten | G01M 3/226 |
| 2011/0283777 | A1 | 11/2011 | Chrissis | |
| 2020/0289759 | A1 | 9/2020 | Horsch | |
| 2021/0389206 | A1 | 12/2021 | Vogt et al. | |

FOREIGN PATENT DOCUMENTS

GB    1063006 A    3/1967

OTHER PUBLICATIONS

"Prefilled syringes—Part 4: Glass barrels for injectables and sterilized subassembled syringes ready for filling", ISO 11040-4, 3rd Edition, Apr. 1, 2015 (60 pages).
Partial European Search Report dated Nov. 28, 2022 for European Patent Application No. 22177085.2 (14 pages).
European Search Report dated Jan. 27, 2023 for European Patent Application No. 22177085.2 (6 pages).

* cited by examiner

*Primary Examiner* — Nguyen Q. Ha
(74) *Attorney, Agent, or Firm* — TAYLOR & EDELSTEIN, PC

(57) ABSTRACT

A method of determining a tightness of a container includes: providing a container having an initial content at a first temperature, the container including a container body and at least one closure device applied to the container body; exposing the container to an ambient liquid during a first predetermined period of time, where during the first predetermined period of time the ambient liquid has a second temperature different from the first temperature; and after the first predetermined period of time has lapsed, determining a tightness of the container based on an amount of the ambient liquid and/or an amount of the initial content of the container having passed across a boundary of the container.

18 Claims, 4 Drawing Sheets

METHOD OF DETERMINING A CONTAINER TIGHTNESS

CROSS REFERENCE TO RELATED APPLICATIONS

This application claims priority to European Patent Application No. EP 22177085.2 filed on Jun. 2, 2022, which is incorporated in its entirety herein by reference.

BACKGROUND OF THE INVENTION

1. Field of the Invention

The application relates to a method of determining the tightness of a container. The application further relates to a method of using results of a tightness determination and a container.

2. Description of the Related Art

In the use of pre-filled pharmaceutical containers, such as pre-filled medical syringes, pharmaceutical vials or cartridges, but also in other fields of uses of a container, tightness of the container is often essential for maintaining an integrity and/or a sterility of the container content. To ensure that a container provides sufficient tightness for a planned use, it is known to perform in advance a tightness test, also known as container closure integrity (CCI) test, on the same container or on another container of the same or a comparable type. Tightness tests may also provide criteria for classifying a container type corresponding to different tightness requirements.

A known method for determining a tightness of a container is the so-called dye solution tightness test, which is laid out in Annex H to Part 4 of the international standard ISO 11040, 3rd edition issued 1 Apr. 2015. According to this standard, sub-assembled syringes which are filled with liquid and closed with a plunger stopper are submerged in a, normally aqueous, dye solution. After a depressurization/re-pressurization cycle, the sub-assembled syringes are inspected for leakage by checking the presence or absence of ingress of the dye solution into the syringe. To this end, the dye solution together with the syringes submerged therein is placed in a vacuum chamber, which produces and holds a negative pressure of at least 270 mbar during a period of half an hour. In the case that a leak is present in one of the containers, a portion of the content inside the container, which is still at atmospheric pressure, will be pressed out through the leak. Afterwards, when the vacuum chamber becomes re-pressurized, a portion of the dye solution is pressed into the container through the leak by the ambient pressure to compensate for the volume of the content that previously had been pressed out. Such dye can subsequently be detected using optical or spectroscopic techniques.

In an alternative method, a transfer of gas is detected which takes place during a depressurization/re-pressurization cycle between air in a headspace of the container and a reference gas, for example, carbon dioxide, in the vacuum chamber. Since the reference gas is typically invisible, subsequent inspection of the container(s) is mostly performed by spectroscopy to thereby detect an anomalous gas composition or concentration of the reference gas in the headspace.

The known methods of determining a container tightness require the provision of a vacuum chamber.

Furthermore, conventional tests often do not provide a reliable indication of a container tightness for many real-use scenarios, for example, pharmaceutical applications including extended storage periods of a container which has been pre-filled with an mRNA vaccine.

Therefore, what is needed in the art is a technique that avoids, or at least mitigates, at least one of the aforesaid disadvantages.

SUMMARY OF THE INVENTION

In some exemplary embodiments provided according to the present disclosure, a method of determining a tightness of a container includes: providing a container having an initial content at a first temperature, the container including a container body and at least one closure device applied to the container body; exposing the container to an ambient liquid during a first predetermined period of time, where during the first predetermined period of time the ambient liquid has a second temperature different from the first temperature; and after the first predetermined period of time has lapsed, determining a tightness of the container based on an amount of the ambient liquid and/or an amount of the initial content of the container having passed across a boundary of the container.

In some exemplary embodiments provided according to the present disclosure, a method includes: using results of a tightness determination to evaluate the suitability of a container for a storage of a solution; and/or connecting and/or linking the results of the tightness determination to a container. The results are obtained by: providing the container having an initial content at a first temperature, the container including a container body and at least one closure device applied to the container body; exposing the container to an ambient liquid during a first predetermined period of time, where during the first predetermined period of time the ambient liquid has a second temperature different from the first temperature; and after the first predetermined period of time has lapsed, determining a tightness of the container based on an amount of the ambient liquid and/or an amount of the initial content of the container having passed across a boundary of the container.

In some exemplary embodiments provided according to the present disclosure, a container includes: a container body; and at least one closure device applied to the container body, the at least one closure device constituting multiple boundaries of the container, the multiple boundaries being arranged in a nested arrangement, the container being configured to fulfil a tightness criterion which is defined at least partly based on a number of boundaries from among the multiple boundaries across which an amount of an ambient liquid and/or an amount of an initial content of the container passes when performing a tightness determination.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
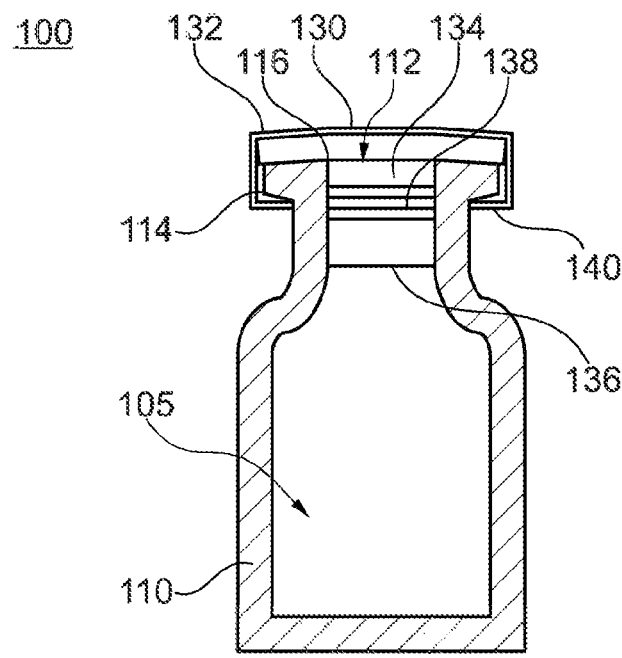
FIG. 1 illustrates an exemplary embodiment of a container provided according to the present disclosure.

In some embodiments provided according to the present disclosure, a method of determining a tightness of a container is provided. The method comprises providing a container having an initial content at a first temperature, the container comprising a container body and at least one closure device applied to the container body. The method further comprises exposing the container to an ambient liquid during a first predetermined period of time, wherein during the first predetermined period of time the ambient liquid has a second temperature different from the first temperature, and, after the first predetermined period of time has lapsed, determining a tightness of the container based on an amount of the ambient liquid and/or an amount of the initial content of the container having passed across a boundary of the container.

The container body and the at least one closure device may define a container volume of the container. The initial content of the container may be arranged in the container volume. The boundary of the container may be identical to a boundary of the container volume. As an alternative, the boundary of the container may extend at least partially outside the container volume.

The initial content may comprise gas, in particular air. In addition or as an alternative, the initial content may comprise a liquid different from the ambient liquid.

Providing the container having the initial content at the first temperature may comprise conditioning the container to have the first temperature. Providing the container having the initial content at the first temperature may comprise conditioning the container such that the initial content of the container has the first temperature. In addition or as an alternative, the method may further comprise conditioning the ambient liquid to have the second temperature during the first predetermined period of time.

Exposing the container to the ambient liquid may comprises immersing, optionally completely immersing, the container in the ambient liquid.

Determining the tightness of the container may comprise assessing the container regarding an amount of the ambient liquid which has entered into the container and/or assessing the ambient liquid regarding an amount of the initial content of the container which has entered into the ambient liquid. The assessing may be performed using microscopy and/or spectroscopy. The assessing may be performed manually and/or automatically.

The first temperature may be a temperature in a first temperature range and the second temperature may be a temperature in a second temperature range, the first temperature range and the second temperature range being non-overlapping.

A difference between the first temperature and the second temperature may be 10 degrees Celsius or more, optionally 30 degrees Celsius or more, optionally 50 degrees Celsius or more, optionally 70 degrees Celsius or more, optionally 90 degrees Celsius or more. In addition or as an alternative, a difference between the first temperature and the second temperature may be 180 degrees Celsius or less, optionally 150 degrees Celsius or less, optionally 130 degrees Celsius or less, optionally 110 degrees Celsius or less. Further, in addition or as an alternative, a difference between the first temperature and the second temperature may be between 10 degrees Celsius and 180 degrees Celsius, optionally between 50 degrees Celsius and 150 degrees Celsius, optionally between 70 degrees Celsius and 130 degrees Celsius, optionally between 90 degrees Celsius and 110 degrees Celsius.

The second temperature may be higher than the first temperature and the second temperature may be −65 degrees Celsius or more, optionally −55 degrees Celsius or more, optionally −45 degrees Celsius or more, optionally −35 degrees Celsius or more, optionally −25 degrees Celsius or more, optionally −15 degrees Celsius or more, optionally −5 degrees Celsius or more, optionally 0 degrees Celsius or more, optionally 15 degrees Celsius or more, optionally 25 degrees Celsius or more, optionally 35 degrees Celsius or more, and/or less than or equal to 150 degrees Celsius, optionally less than or equal to 120 degrees Celsius, optionally less than or equal to 90 degrees Celsius.

Alternatively, the second temperature may be lower than the first temperature and the second temperature may be 30 degrees Celsius or less, optionally 15 degrees Celsius or less, optionally 5 degrees Celsius or less, optionally 0 degrees Celsius or less, optionally −1 degrees Celsius or less, optionally −3 degrees Celsius or less, optionally −5 degrees Celsius or less, optionally −15 degrees Celsius or less, optionally −25 degrees Celsius or less, optionally −35 degrees Celsius or less, optionally −45 degrees Celsius or less, optionally −65 degrees Celsius or less, optionally −75 degrees Celsius or less, optionally −85 degrees Celsius or less, and/or more than or equal to −200 degrees Celsius, optionally more than or equal to −150 degrees Celsius, optionally more than or equal to −100 degrees Celsius.

The first predetermined period of time may be 1 minute or more, optionally 30 minutes or more, optionally 1 hour or more, optionally 3 hours or more, optionally 6 hours or more, optionally 9 hours or more, optionally 12 hours or more, optionally 15 hours or more, optionally 20 hours or more, optionally 24 hours or more. In addition or as an alternative, the first predetermined period of time may be 1 month or less, optionally 1 week or less, optionally 3 days or less, optionally 30 hours or less.

The ambient liquid and/or the initial content of the container may comprise an organic solvent and/or water, optionally an aromatic compound, organic acid, ether, ester, alkane, ketone, aldehyde or alcohol, optionally $H_3C\text{---}(CH_2)$n-OH, where n is chosen from the range 0 to 15, optionally 0 to 8, optionally 0 to 3, optionally methanol or ethanol, n-propanol or iso-propanol, diethyl ether or THF, n-butyl methyl ether, iso-butyl methyl ether, ethyl acetate, methyl acetate, benzene, toluene, ethylbenzene, mesitylene, p-xylene, m-xylene, o-xylene, acetone, butanone, formaldehyde, acetaldehyde, propionic aldehyde, propionic acid, acetic acid, formic acid, methyl tert-butyl ether.

A concentration of the organic solvent may be 25 weight percent or more, optionally 50 weight percent or more, optionally 75 weight percent or more, optionally 85 weight percent or more, optionally 90 weight percent or more, optionally 95 weight percent or more, optionally 97 weight percent or more, wherein the concentration of the organic solvent is with respect to the total mass in the ambient liquid and/or the initial content, respectively. In addition or as an alternative, the concentration of the organic solvent may be 99.9 weight percent or less, optionally 99 weight percent or less, optionally 98 weight percent or less with respect to the total mass in the ambient liquid and/or the initial content, respectively.

In addition or as an alternative, a concentration of the organic solvent may be 25 volume percent or more, optionally 50 volume percent or more, optionally 75 volume percent or more, optionally 85 volume percent or more, optionally 90 volume percent or more, optionally 95 volume percent or more, optionally 97 volume percent or more, wherein the concentration of the organic solvent is with respect to the total volume in the ambient liquid and/or the initial content, respectively. In addition or as an alternative, the concentration of the organic solvent may be 99.9 volume percent or less, optionally 99 volume percent or less, optionally 98 volume percent or less with respect to the total volume in the ambient liquid and/or the initial content, respectively.

The initial content of the container and/or the ambient liquid may comprise a dye. The dye may be an organic dye. The dye may comprise at least one aromatic moiety, optionally riboflavin, fluorescein or bromothymol blue, optionally fluorescein.

The second temperature may be higher than the first temperature and the initial content of the container may comprise a dye. Alternatively, the second temperature may be lower than the first temperature and the ambient liquid may comprise a dye.

The method may further comprise, during the first predetermined period of time, applying a negative pressure to an environment of the ambient liquid, for example, when both the first and the second temperatures are close to a room temperature. The negative pressure may be produced at least partially by a vacuum pump acting on the environment of the ambient liquid. The method may further comprise, during or after the first predetermined period of time, releasing the negative pressure from the environment of the ambient liquid. However, applying a negative pressure is only optional and is not necessary in some embodiments of the method. For example, in embodiments in which the second temperature is lower than the first temperature and the second temperature is −45 degrees Celsius or less.

The method may further comprise, after the first predetermined period of time has lapsed and before determining a tightness of the container, conditioning the container during at least a second predetermined period of time such that a temperature of the container returns towards the first temperature.

The container may be a pharmaceutical container which has been closed and/or sealed, wherein determining the tightness of the container comprises determining a tightness of a closure and/or sealing of the container.

The container may be a vial, optionally closed by a stopper. Alternatively, the container may be a syringe, optionally closed on opposing sides by a tip cap and a plunger. Further alternatively, the container may be a cartridge, optionally closed by a stopper and a plunger.

The at least one closure device may constitute multiple boundaries of the container, the multiple boundaries arranged in a nested arrangement. Determining the tightness of the container may be based at least partly on a number of boundaries from among the multiple boundaries across which an amount of the ambient liquid and/or an amount of an initial content of the container has passed.

The method may further comprise using results of the determined tightness to evaluate the suitability of the container for the storage of a solution, optionally a pharmaceutical solution, optionally at low temperature and/or reduced pressure.

In addition or as an alternative, the method may further comprise connecting and/or linking results of the determined tightness to the container.

According to some embodiments, a method of using results of a tightness determination to evaluate the suitability of a container for the storage of a solution, optionally a pharmaceutical solution, optionally at low temperature and/or reduced pressure, is provided. The results are obtainable by the method as presently provided.

The method may further comprise connecting and/or linking the results of the tightness determination to the container. The container may be a pharmaceutical container.

According to some embodiments, a method is provided. The method comprises connecting and/or linking results of a tightness determination to a container, optionally a pharmaceutical container. The results are obtainable by the determining method as presently provided.

According to some embodiments, a container is provided. The container comprises a container body and at least one closure device applied to the container body. The at least one closure device constitutes multiple boundaries of the container, the multiple boundaries arranged in a nested arrangement. The container is configured to fulfil a tightness criterion which is defined at least partly based on a number of boundaries from among the multiple boundaries across which an amount of the ambient liquid and/or an amount of an initial content of the container passes when using the method as presently provided.

Each of at least some of the multiple boundaries may be constituted by one of multiple sealing ribs of the closure device. The container may be considered to fail the tightness criterion when the amount of the ambient liquid and/or the amount of the initial content of the container passes across more than one of the multiple sealing ribs. As an alternative, the container may be considered to fail the tightness criterion when the amount of the ambient liquid and/or the amount of the initial content of the container passes across more than two, or, alternatively, more than a number larger than two, of the multiple sealing ribs.

Referring now to the drawings, FIG. 1 shows schematically and exemplarily a container 100. The container comprises a container body 110 and a closure device 130. The closure device 130 seals an opening 112 of the container body 110. When the container body 110 is sealed by the closure device 130, the container body 110 and the closure device 130 enclose a container volume 105 inside the container 100. In the shown example, the closure device 130 is a stopper having a plug 134 which extends in the container body 110 in the region of the opening 112. A container volume 105 of the container 100 is defined by a portion of the inner wall of the container body 110 and by an inner surface 136 of the plug 134.

The container body 110 has a crown 114 which surrounds the opening 112 of the container 100. The crown 114 serves for retaining a cap 132 of the stopper 130 in a sealing position of the stopper 130. For this purpose, the cap 132 is crimped onto the crown 114. In addition, a holding element 140 extends below an underside of the crown 114.

The plug 134 is further provided with one or more sealing ribs 138 which extend along a side surface of the plug 134. The one or more sealing ribs 138 serve for sealing a gap between the plug 134 and the inner wall of the container body 110 and/or for balancing a break-loose and/or gliding force of the plug 134 during opening and closing of the container 100. For this purpose, the plug 134 optionally comprises elastic material.

Concerning maintenance of a sterility or an integrity of a container content, the container 100 has various structures which can potentially serve as a boundary of the container 100 which a content in the container volume 105 and/or an ambient substance at an outside of the container 100 must not transgress in order for the sterility or the integrity of the container and of its content to be preserved.

For example, in certain applications and/or implementations of the container 100 integrity of the container content may be seen as compromised or lost when a respective one of the following structures of the container 100 is transgressed either by the container content or an ambient substance: a seam between the inner wall of the container body 110 and the inner surface 136 of the plug 134, a seam between the inner wall of the container body 110 and any one of the one or more sealing ribs 138, a seam between an interior edge 116 of the crown 114 and an underside of the cap 132, a seam between the holding element 140 and an outer surface of the container body 110. In some embodiments, the various structures of the container 100 provide different degrees of tightness, and a boundary of the container 100 is chosen according to the structure providing the greatest tightness.

In the shown example, the container 100 comprises a pharmaceutical vial. In other examples, the container 100 comprises other types of containers, such as a medical syringe or a pharmaceutical cartridge. Furthermore, in other examples a container has other and/or additional structures than the shown container 100 which may serve as a boundary of the container concerning the maintenance of a sterility or an integrity of the container and/or its container content.

Figure 2:
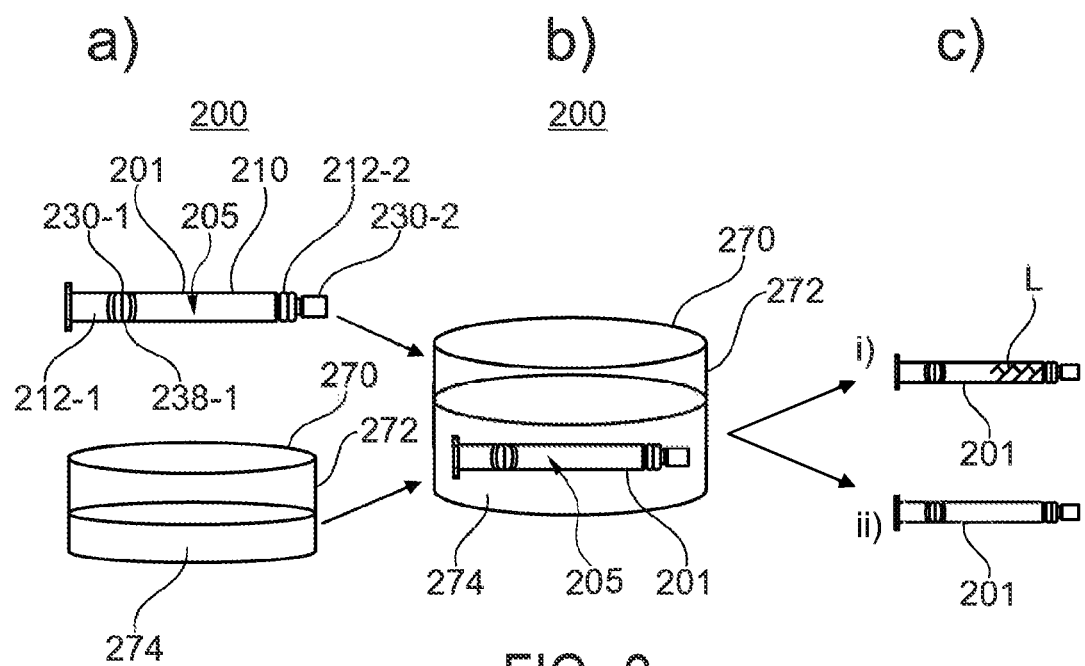
FIG. 2 illustrates different stages of a setup for determining a tightness of a container.

FIG. 2 shows schematically and exemplarily a setup 200 for determining a tightness of a container, at different stages. The setup 200 comprises an immersion arrangement 270 and a container 201 for use with the immersion arrangement 270.

The container 201 comprises a container body 210 having two openings 212-1, 212-2 arranged on different sides of the container body 210. Each of the openings 212-1, 212-2 is sealed by a closure device 230-1, 230-2. A container volume 205 of the container 201 is defined by a portion of the inner wall of the container body 210 and an inner surface of each of the closure devices 230-1, 230-2. Regarding the container 201, especially the container body 210 and each of the closure devices 230-1, 230-2 the previous description of the container 100 applies correspondingly, unless otherwise clear from the following description and the drawings.

In the shown example, the container 201 is a medical syringe or a pharmaceutical cartridge. A first opening 212-1 at a proximal end of the container body 210 is sealed by a closure device 230-1 in the form of a stopper consisting essentially of a plug. Similar to the plug 138, the closure device 230-1 has one or more sealing ribs 238-1 along its side surface. A second opening 212-2 at a distal end of the container body 210 is arranged in a tip of the container 201, and it is sealed by a closure device 230-2 in the form of a cap. Analogously to the example in FIG. 1, the container 201 has structures which may serve as a boundary of the container 201 with respect to a sterility or an integrity of the container 201 or its content. In some embodiments, in the region of one or both of the closure devices 230-1, 230-2 various structures are provided which can serve as a possible boundary of the container 201. These structures include, for example, a seam between an inner wall of the container body 210 and an inner surface of the closure device 230-1, a seam between an inner wall of the container body 210 and any one of the one or more sealing ribs 238-1, a seam between an inner edge of the second opening 212-2 and an inner surface of the cap 230-2, a seam between an outer surface of the container body 210 in the region of the second opening 212-2 and a rim of the cap 230-2.

The container volume 205 comprises, optionally contains, an initial content, for example, a gas, such as air, or a liquid, such as a reference liquid or a testing liquid, or both liquid and gas.

The immersion arrangement 270 comprises an immersion device 272. In the immersion device 272, a reservoir is provided which in connection with determining a tightness of a container serves as an ambient liquid 274. In the example of FIG. 2, the immersion device 272 is shown as a simple tub. In other examples, the immersion device 272 further includes conditioning facilities, for example, for adjusting and holding a temperature of the ambient liquid 274 in accordance with an intended use for determining a tightness of a container as described below. In other examples, the immersion device 272 further comprises an arrangement for holding and moving one or more containers 201, in particular, for charging the immersion device 272 and for reversibly immersing the one or more containers 201 in the ambient liquid 274.

As shown in FIG. 2, a), in a first example of the described process, the container volume 205 is provided to be entirely filled with gas, such as air. In addition, the container 201, including the gas inside the container volume 205, is conditioned to have a first temperature, for example, room temperature, around 25 degrees Celsius. Furthermore, the ambient liquid 274 is conditioned to have a second temperature significantly lower than the first temperature, for example, around −80 degrees Celsius.

In some embodiments, the ambient liquid 274 comprises an organic solution having a freezing point significantly in the negative Celsius range. This enables a corresponding application of the described process with a second temperature in the negative Celsius range down until near the freezing point of the ambient liquid 274. Furthermore, in some embodiments, the ambient liquid 274 comprises a dye which is present in the ambient liquid 274, for example, in a resolved form. The dye solution comprises, optionally contains, in some example ethanol as a solvent in which fluorescein disodium is dissolved as dye, in a concentration of 1 gram per 1 litre.

As shown in FIG. 2, b), in a next step, the container 201 is placed inside the ambient liquid 274. Optionally, the container 205 is entirely submerged in the ambient liquid 274. Whilst submerged in the ambient liquid 274, the container 201 will gradually adopt a temperature at least close to the second temperature. In some embodiments, an absolute heat capacity of the container 201 is small relative to an absolute heat capacity of the ambient liquid 274. In this way, temperature variations of the ambient liquid 274 due to the immersion of the container 201 can be kept minimal.

When the temperature of the container 201 sinks due to the immersion in the ambient liquid 274, a temperature of the gas in the container volume 205 will sink correspondingly. Hence, the gas in the container volume 205 will contract, and a gas pressure within the container volume 205 will drop below an ambient pressure which is constituted, for example, by the ambient air pressure plus a, mostly negligible, pressure caused by the column of ambient liquid above the container 201. If the container 201 has a leak sufficiently large, parts of the ambient liquid 274 will be pressed into the container 201 via the leak by the excess pressure on the outside of the container 201.

The container 201 remains in the ambient liquid 274 during at least a predetermined period of time. The period of time is chosen to allow that a temperature inside the container 201 comes close enough to the second temperature and that a transgression of liquid through a possible leak in the container 201 due to the pressure difference between the inside of the container 201 and an ambient pressure can take place. In some embodiments, the predetermined period of time is chosen to be ca. 30 minutes. In other examples, the predetermined period of time is chosen to be less or more than ca. 30 minutes.

FIG. 2, c), shows schematically two possible outcomes once the container 201 has been removed from the ambient liquid 274. In the upper example, i), an amount L of the ambient liquid is detected inside the container volume 205. In particular, an amount L of ambient liquid 274 has transgressed a boundary of the container 201 in the region of the tip. This indicates the presence of a leak in the region of the tip of the container 201 under the conditions applied in previous stages a) and b). In the lower example, ii), no parts of the ambient liquid 274 are detected inside the container 201. This indicates tightness of the container 201 under the conditions applied in previous stages a) and b).

Using an organic solution for the ambient liquid 274 allows for a second temperature in the range around −50 to −90 degrees Celsius, which overlaps with the range of storage temperatures, for example, of various vaccines. Hence, the process can be performed to determine a tightness of the container 201 at an intended temperature of use of the container 201 for relevant applications.

Furthermore, a pressure difference between the inside of the container 201 and an ambient pressure when the container 201 filled with a gas is immersed in the ambient liquid 274 can be roughly determined based on the equation for ideal gases. According to the equation, the pressure inside the container is linearly proportional to the temperature inside the container 201. Accordingly, when the container 201 is assumed to be at atmospheric pressure and 25 degrees Celsius at the outset, immersing the container 201 in the ambient liquid 274 at −80 degrees Celsius, for example, will lead to a temperature change from about 298 Kelvin to 193 Kelvin, leading to a pressure drop by about 330 mbar relative to atmospheric pressure. This corresponds also to the pressure requirements defined in the international standard ISO 11040, Part 4, issued 1 Apr. 2015, which demand a negative pressure of at least 270 mbar in order to ensure valid results.

Corresponding calculation for a second temperature at −50 degrees Celsius still yields a pressure drop inside the container 201 by about 235 mbar. Though different from the international standard ISO 11040 of 2015, meaningful results can still be expected for many relevant use cases also under such pressure conditions.

In some embodiments, after removing the container 201 from the ambient liquid 274 the container 274 is conditioned during at least another predetermined period of time prior to allow for its temperature to at least essentially return to the first temperature, before the container 201 is inspected for possible dye ingress.

In the above description, it has been assumed that the container 201 initially comprises, optionally contains, gas and that the second temperature, i.e., the temperature of the ambient liquid 274, is less than a first temperature of the container 201 at the outset of the process, and that the content of the container 201 will be finally inspected concerning a dye ingress. However, in alternative examples of the method, the container 201 initially comprises, optionally contains, a liquid with a dye resolved therein. In some of these embodiments, the ambient liquid 274 has a second temperature which is higher than the first temperature of the container 201. Immersing the container 201 in the ambient liquid 274 will correspondingly lead to an increase of pressure inside the container 201. If the container 201 has a leak sufficiently large, parts of the dye solution thus will be pressed into the ambient liquid 274 via the leak by the excess pressure inside the container 201. Determining the presence or absence of a leak in the container 201 is finally performed in this case based on an inspection of the ambient liquid 274 for portions of the dye solution that have egressed from the container 201.

In some embodiments, the process at stage b) includes applying a negative pressure to an environment of the ambient liquid 274. For example, the immersion arrangement 270 is configured for this purpose to at least partially evacuate a space of air above the ambient liquid 274 in the immersion device 272. To this end, the immersion arrangement 270 comprises a vacuum pump in some embodiments. In other embodiments, the immersion device 272 is configured to be transferred, at least temporarily, into a vacuum chamber which is external to the immersion arrangement 270. Applying a negative pressure to the environment of the ambient liquid 274 facilitates in some embodiments the adjusting of a pressure difference between an inside and an outside of the container 201.

Furthermore, in applications of the setup 200 in which a difference between the first temperature and the second temperature is too small to generate a significant pressure difference between an inside and an outside of the container 201, for example, when both the first and the second temperatures are close to a room temperature, applying a negative pressure to the environment of the ambient liquid 274 can be suited to produce a suitable pressure difference. A transfer of dye occurs, for example, from inside the container 201 to the ambient liquid during application of the negative pressure. In some embodiments, a transfer of dye occurs from the ambient liquid into the container 201, after a negative pressure has been applied for an extended period to the environment of the ambient liquid 274, and has been transmitted via the ambient liquid 274 into the container 201, and is then released. However, generating a suitable pressure difference by using a vacuum pump is not required in most embodiments of the system 200, due to a pressure difference resulting from the difference between the first and the second temperatures, as described.

In addition or as an alternative, in some embodiments, the process at stage b) further includes, after exposing the container 201 to the second temperature in the ambient liquid 274 and before determining a tightness of the container 201 at stage c), conditioning the container 201 such that a temperature of the container 201 returns towards the first temperature. To this end, in some embodiments, the immersion device 272 with the container 201 placed therein is exposed to the first temperature in order for the ambient liquid 274 to gradually change its temperature from the second temperature towards the first temperature. In some embodiments, the container 201 is removed from the ambient liquid 274 and placed in another ambient liquid (not shown) at a temperature equal to the first temperature or at least closer to the first temperature. This causes a fast conditioning of the container 201, since no heat transfer needs to take place on the ambient liquid 274.

It has been found that fast conditioning of the container 201 from a lower second temperature towards a higher first temperature, especially by thawing from −80 degrees Celsius to room temperature, poses higher stress on a tightness of the container 201 than a slow conditioning which occurs when conditioning the ambient liquid 274 as a whole. A possible reason is that the syringe body warms up faster than the stopper, which temporarily reduces a tightness of the container while a pressure difference between the inside and the outside of the container still exists.

By applying the described tightness test to a range of medical syringes, it has been found that an increased amount of siliconization, for example, as a layer of cured silicon oil, on the inner wall of the syringe body leads to improved tightness when using an uncoated stopper than with a silicon-coated stopper, in the case that fast conditioning of the syringe was performed from a lower second temperature, especially around minus 80 degrees Celsius, towards room temperature.

The following Table 1 contains the results of a container tightness test as described above which has been applied to syringe sets consisting of a predefined number of syringes (first column) and having varying syringe properties (second to fourth columns). The varying syringe properties include syringe sizes (second column), barrel siliconization compositions (third column), and amounts of siliconization applied (fourth column). In the last column, unless all syringes of a set have passed the tightness test (Result: OK), the number x of syringes that failed the test out of a given syringe set size y is indicated (Result: x/y fail). In all cases, an open end of the syringe barrel was closed using Datwyler FM257 stopper and the tip was closed using West 7025 tip cap. In addition, in all cases a siliconization coating was applied to the syringe tip using Composition A, as described below.

TABLE 1

| Set size | Barrel ID (mm) | Barrel siliconization composition | Amount coating (µl) | Result |
|---|---|---|---|---|
| 5 | 5.85 | Comp. B | 16 | OK |
| 5 | 5.85 | Comp. A | 20 | OK |
| 5 | 5.85 | Comp. A | 12 | OK |
| 5 | 5.85 | Comp. A | 10 | OK |
| 5 | 5.85 | Comp. A | 8 | 4/5 fail |
| 5 | 5.85 | Comp. A | 4 | 5/5 fail |
| 5 | 6.35 | Comp. B | 16 | OK |
| 5 | 5.85 | Comp. C | 16 | 5/5 fail |
| 5 | 6.35 | Comp. C | 16 | 5/5 fail |

Apart from a reference Composition C of pure silicone oil, the barrel siliconization compositions in Table 1 include Composition A and Composition B. For each of Compositions A and B, the following Table 2 contains the constituents and their functions as well as their respective concentrations in percentage by weight.

TABLE 2

| Component | Function | Composition A | Composition B |
|---|---|---|---|
| vinyl-terminated polydimethylsiloxane | cross-linkable polysiloxane structural units | 9.59 wt. % | 10.59 wt. % |
| methylhydrosiloxane/ dimethylsiloxane copolymer | crosslinking polysiloxane | 0.24 wt. % | 0.26 wt. % |
| Pt complex | catalyst | 0.13 wt. % | 0.15 wt. % |
| silicone oil 20,000 cSt | non-cross-linkable polysiloxane structural units | 3.84 wt. % | 4.24 wt. % |
| silicone oil 1,000 cSt. | non-cross-linkable polysiloxane structural units | 9.46 wt. % | 0.00 wt. % |
| HMDSO | diluent | ad 100 wt. % | ad 100 wt. % |

Figure 3:
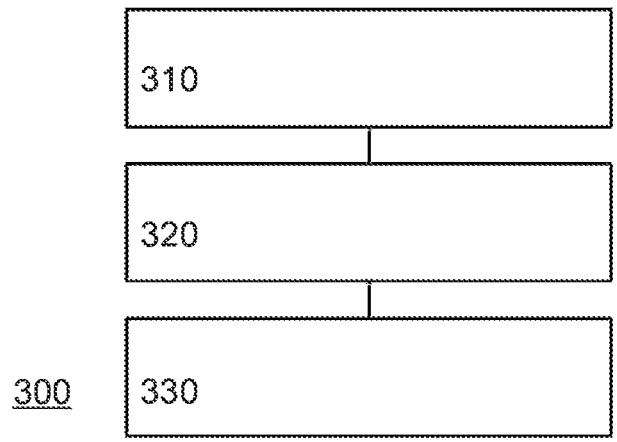
FIG. 3 illustrates a flow diagram of an exemplary embodiment of a method for determining a tightness of a container according to the present disclosure.

FIG. 3 shows schematically and exemplarily a flow diagram of a method 300 of determining a tightness of a container, for example a container such as container 100 or container 201. The method 300 comprises providing a container having a first temperature, step 310. The method 300 further comprises exposing the container to an ambient liquid, for example, ambient liquid 274 shown in FIG. 2, (stages a) and b)), during a first predetermined period of time, wherein during the first predetermined period of time the ambient liquid has a second temperature different from the first temperature, step 320. After the first predetermined period of time has lapsed, a tightness of the container is determined based on an amount of the ambient liquid and/or an amount of an initial content of the container having passed across a boundary of the container, step 330.

Figure 4:
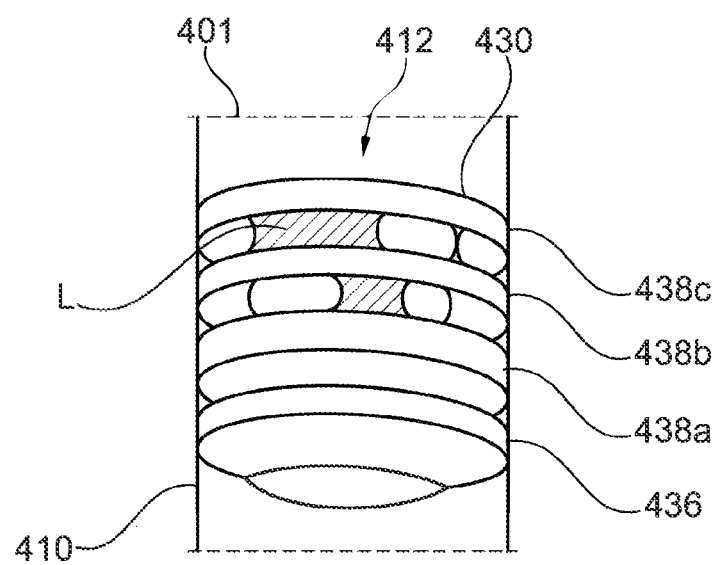
FIG. 4 illustrates another exemplary embodiment of a container provided according to the present disclosure.

FIG. 4 shows schematically and exemplarily a detail of a container 401 provided according to another embodiment. The container 401 comprises a container body 410 having an opening 412 and a closure device 430 which seals the opening 412. The closure device 430 is a stopper consisting essentially of a plug. Similar to the plug 138 and the closure device 230-1, the closure device 430 has an inner surface 436 and three sealing ribs 438a, 438b, 438c along its side surface. As further shown in FIG. 4, an amount L of an ambient liquid is found in spaces between the sealing ribs 438a, 438b, 438c.

FIG. 4 shows the container 401 after a process as described in connection with FIGS. 2 and 3. In the case shown in FIG. 4, the amount L of the ambient liquid has not entered a container volume of the container 401. In particular, the amount L has not transgressed a seam between the inner wall of the container body 410 and the inner surface 436 of the closure device 430. Still, an integrity or a sterility of the container 401 or its content need to be regarded as compromised or lost in certain examples under the conditions applied during the process, for example, if the central sealing rib 438b, or even merely the outer sealing rib 438c, is transgressed. In such cases, the respective sealing rib 438b or 438c defines the boundary of the container 401 in the context of the tightness determination process.

Other examples of a closure device have more and/or other structures than the closure device 430 which may serve as boundaries of a container. In some embodiments the various structures of the closure device can be regarded as multiple boundaries that enclose one another in a nested manner. Furthermore, in different example applications, different ones of the multiple (possible) boundaries provided by a closure device are regarded as the boundary of the container when applying the technique described herein.

Figures 5, 6:
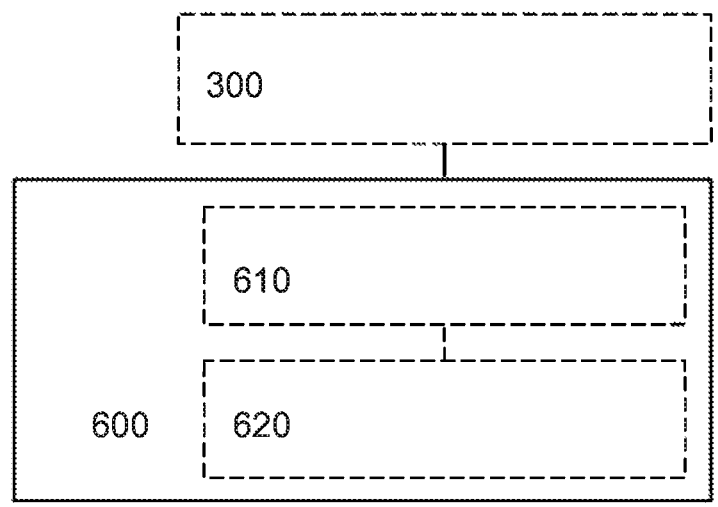
FIG. 5 illustrates a flow diagram of an exemplary embodiment of a method provided according to the present disclosure.
FIG. 6 illustrates a flow diagram of another exemplary embodiment of a method provided according to the present disclosure.

FIG. 5 shows schematically and exemplarily a flow diagram of a method 500. The method 500 is a method of using results of a tightness determination to evaluate the suitability of a container for a storage of a solution, optionally a pharmaceutical solution, optionally at low temperature and/or reduced pressure. The results are obtained by a process as described above and below.

FIG. 6 shows schematically and exemplarily a flow diagram of a method 600. The method 600 comprising using the results of a tightness determination obtainable by a method as described above and below to evaluate the suitability of a container for a storage of a solution, optionally a pharmaceutical solution, optionally at low temperature and/or reduced pressure, step 610. In addition or as an alternative, the method 600 comprises connecting and/or linking the results of the tightness determination obtainable by as described above and below to a container, optionally a pharmaceutical container. In some embodiments, the method 600 is performed after execution of the method 300 as described above, involving the results obtained by the method 300.

Figure 7:
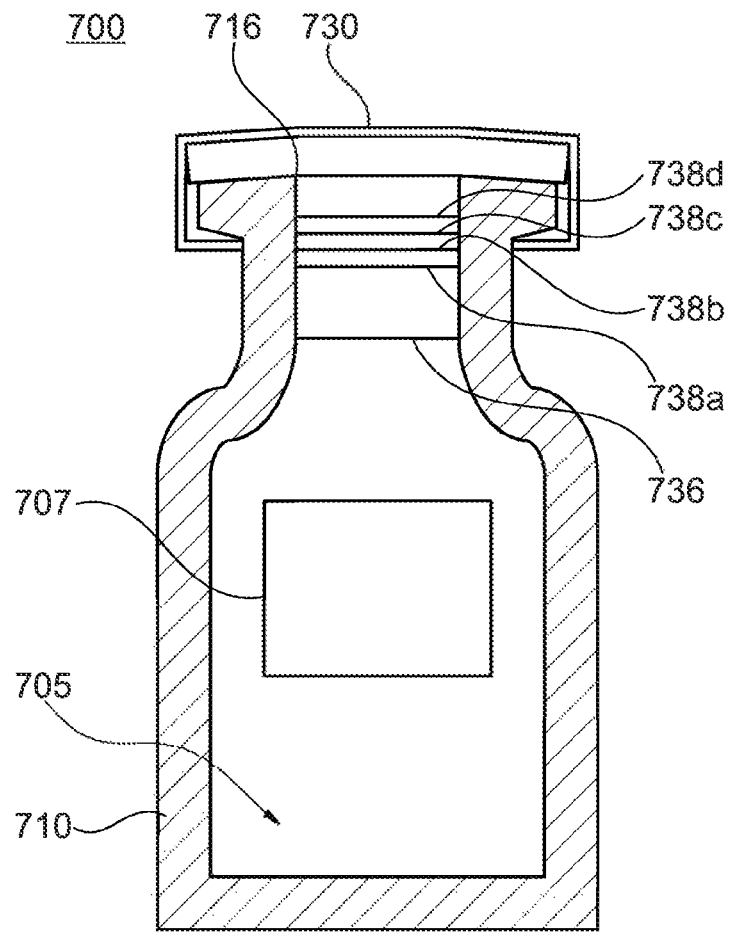
FIG. 7 illustrates another exemplary embodiment of a container provided according to the present disclosure.

FIG. 7 shows schematically and exemplarily a container 700. Similar to the container 100, the container 700 comprises a container body 710 and a closure device 730. Moreover, an inner surface 736 of the closure device 730 and a portion of an inner wall of the container body 710 define a container volume 705 of the container 700. The closure device 730 comprises a plurality of sealing ribs 738a-738d. Furthermore, the container body 710 has a crown having an inner edge 716.

Analogously to the previous examples, each of the inner surface 736 and the sealing ribs 738a-738d of the closure device 730 and the inner edge 716 can be part of a structure that serves as a boundary of the container 700 with respect to an integrity or a sterility of the container 700 or its content. Furthermore, a possible boundary of the container 700 may be considered to fulfil a tightness requirement in accordance with particular conditions applied during a tightness determination process as described above. The container 700 is correspondingly linked with the results of the tightness determination. In the shown example, the container 700 is provided with a label 707 which displays information indicative of the tightness of the container 700 based on a tightness criterion in accordance with a process described herein. In other examples, the results of the tightness determination are linked to the container 700 in other ways.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of determining a tightness of a container, the method comprising:
    providing a container having an initial content at a first temperature, the container comprising a container body and at least one closure device applied to the container body;
    exposing the container to an ambient liquid during a first predetermined period of time, wherein during the first predetermined period of time the ambient liquid has a second temperature different from the first temperature, wherein the exposing comprises immersing the container in the ambient liquid so the ambient liquid contacts the container; and
    after the first predetermined period of time has lapsed, determining a tightness of the container based on an amount of the ambient liquid and/or an amount of the initial content of the container having passed across a boundary of the container.

2. The method of claim 1, wherein at least one of the following is satisfied:
    providing the container having the initial content at the first temperature comprises conditioning the container to have the first temperature; or
    the method further comprises conditioning the ambient liquid to have the second temperature during the first predetermined period of time.

3. The method of claim 1, wherein exposing the container to the ambient liquid comprises immersing the container in the ambient liquid.

4. The method of claim 1, wherein at least one of the following is satisfied:
    the method further comprises assessing the container regarding the amount of the ambient liquid which has entered into the container and/or assessing the ambient liquid regarding an amount of the initial content of the container which has entered into the ambient liquid; or
    the first temperature is a temperature in a first temperature range and the second temperature is a temperature in a second temperature range, the first temperature range and the second temperature range being non-overlapping.

5. The method of claim 1, wherein a difference between the first temperature and the second temperature is 10 degrees Celsius or more and/or 180 degrees Celsius or less.

6. The method of claim 1, wherein the second temperature is higher than the first temperature and the second temperature is -65 degrees Celsius or more and less than or equal to 150 degrees Celsius, or the second temperature is lower than the first temperature and the second temperature is 30 degrees Celsius or less and more than or equal to -200 degrees Celsius.

7. The method of claim 1, wherein the first predetermined period of time is 1 minute or more and/or 1 month or less.

8. The method of claim 1, wherein the initial content comprises at least one of gas, air, or a liquid different from the ambient liquid.

9. The method of claim 1, wherein the ambient liquid and/or the initial content of the container comprises an organic solvent and/or water.

10. The method of claim 9, wherein the ambient liquid and/or the initial content of the container comprises an organic solvent and a concentration of the organic solvent is 25 weight percent or more with respect to a total mass in the ambient liquid and/or the initial content; and/or a concentration of the organic solvent is 25 volume percent or more with respect to a total volume in the ambient liquid and/or the initial content.

11. The method of claim 1, wherein the initial content of the container and/or the ambient liquid comprises a dye.

12. The method of claim 11, wherein the second temperature is higher than the first temperature and the initial content of the container comprises a dye, or wherein the second temperature is lower than the first temperature and the ambient liquid comprises a dye.

13. The method of claim 11, wherein the dye comprises at least one of: an organic dye; at least one aromatic moiety; riboflavin; fluorescein; or bromothymol blue.

14. The method of claim 1, wherein the method further comprises, after the first predetermined period of time has lapsed, conditioning the container during at least a second predetermined period of time such that a temperature of the container returns towards the first temperature.

15. The method of claim 14, wherein conditioning the container during at least the second predetermined period of time comprises:
exposing the ambient liquid to a third temperature which is equal to the first temperature or closer to the first temperature than is the second temperature while the container remains exposed to the ambient liquid; or
exposing the container to another ambient liquid having a temperature which is equal to the first temperature or closer to the first temperature than is the second temperature.

16. The method of claim 1, wherein the container is a pharmaceutical container which has been closed and/or sealed and wherein determining the tightness of the container comprises determining a tightness of a closure and/or sealing of the container.

17. The method of claim 1, wherein the at least one closure device constitutes multiple boundaries of the container, the multiple boundaries being arranged in a nested arrangement, and wherein determining the tightness of the container is based at least partly on a number of boundaries from among the multiple boundaries across which an amount of the ambient liquid and/or an amount of the initial content of the container has passed.

18. A method, comprising:
using results of a tightness determination to evaluate the suitability of a container for a storage of a solution; and/or
connecting and/or linking the results of the tightness determination to a container, wherein the results are obtained by:
providing the container having an initial content at a first temperature, the container comprising a container body and at least one closure device applied to the container body;
exposing the container to an ambient liquid during a first predetermined period of time, wherein during the first predetermined period of time the ambient liquid has a second temperature different from the first temperature, wherein the exposing comprises immersing the container in the ambient liquid so the ambient liquid contacts the container; and
after the first predetermined period of time has lapsed, determining a tightness of the container based on an amount of the ambient liquid and/or an amount of the initial content of the container having passed across a boundary of the container.

* * * * *